United States Patent
Hioki

(10) Patent No.: US 12,257,759 B2
(45) Date of Patent: Mar. 25, 2025

(54) FILM MOLDING DEVICE

(71) Applicant: SUMITOMO HEAVY INDUSTRIES, LTD., Tokyo (JP)

(72) Inventor: Kazuya Hioki, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 50 days.

(21) Appl. No.: 18/329,612

(22) Filed: Jun. 6, 2023

(65) Prior Publication Data

US 2023/0311400 A1 Oct. 5, 2023

Related U.S. Application Data

(63) Continuation of application No. PCT/JP2022/013699, filed on Mar. 23, 2022.

(30) Foreign Application Priority Data

Mar. 31, 2021 (JP) ................................ 2021-060747

(51) Int. Cl.
*B29C 48/10* (2019.01)
*B29C 48/88* (2019.01)
*B29L 23/00* (2006.01)

(52) U.S. Cl.
CPC ............ *B29C 48/913* (2019.02); *B29C 48/10* (2019.02); *B29L 2023/001* (2013.01)

(58) Field of Classification Search
CPC .. B29C 48/913; B29C 48/10; B29L 2023/001
USPC ...................................................... 425/72.1
See application file for complete search history.

(56) References Cited

U.S. PATENT DOCUMENTS

| | | | |
|---|---|---|---|
| 5,281,375 | A | 1/1994 | Konermann |
| 5,326,627 | A | 7/1994 | Yazaki et al. |
| 5,468,444 | A | 11/1995 | Yazaki et al. |
| 2018/0361647 | A1 | 12/2018 | Nakano |

FOREIGN PATENT DOCUMENTS

| | | |
|---|---|---|
| JP | S54-64563 A | 5/1979 |
| JP | S54-180479 U | 12/1979 |
| JP | S58-059069 A | 4/1983 |
| JP | S61-44624 A | 3/1986 |
| JP | H6-000872 A | 1/1994 |
| JP | H6-008320 A | 1/1994 |
| JP | H7-060833 A | 3/1995 |
| JP | H8-034053 A | 2/1996 |
| JP | H8-039667 A | 2/1996 |
| JP | H8-47973 A | 2/1996 |
| JP | H8-290457 A | 11/1996 |
| JP | H8-290458 A | 11/1996 |
| JP | 2017-177348 A | 10/2017 |

OTHER PUBLICATIONS

European search report of EP Application No. 22780420.0 Mailed on Jul. 26, 2024.
International Search Report of PCT/JP2022/013699, mailed on Apr. 26, 2022.

*Primary Examiner* — Jeffrey M Wollschlager
*Assistant Examiner* — Xue H Liu
(74) *Attorney, Agent, or Firm* — WTA Patents

(57) ABSTRACT

A film molding device includes: a cooling unit that cools a molding material discharged from a mold; and a rectifying unit that rectifies cooling air blown out from the cooling unit. The rectifying unit includes a suction portion that suctions the cooling air.

5 Claims, 9 Drawing Sheets

FILM MOLDING DEVICE

CROSS-REFERENCE TO RELATED APPLICATIONS

This application is a bypass continuation of International PCT Application No. PCT/JP2022/013699, filed on Mar. 23, 2022, which claims priority to Japanese Patent Application No. 2021-060747, filed on Mar. 31, 2021, which are incorporated by reference herein in their entirety.

BACKGROUND

Technical Field

Certain embodiments of the present invention relate to a film molding device.

Description of Related Art

A film molding device has been known that molds a film by extruding a molten molding material in a film shape from a discharge port of a mold and by solidifying the molten molding material using cooling air from a cooling unit. In the related art, a film molding device has been proposed that regulates the thickness of the film within a target range by adjusting the width of the discharge port or the air speed or air temperature of the cooling air from the cooling unit.

SUMMARY

According to an embodiment of the present invention, there is provided a film molding device including: a cooling unit that cools a molding material discharged from a mold; and a rectifying unit that rectifies cooling air blown out from the cooling unit. The rectifying unit includes a suction portion that suctions the cooling air.

DETAILED DESCRIPTION

The cooling air blown out from the cooling unit is a jet flow, and the flow becomes a turbulent flow. When the cooling air is a turbulent flow, the cooling capacity differs depending on the position in an extending direction of the discharge port and the time even at the same position, and as a result, the thickness of the molded film becomes non-uniform. In addition, the cooling air that is a turbulent flow vibrates the molding material extruded in a film shape, and as a result, the quality of the molded film deteriorates.

It is desirable to provide a film molding device capable of reducing the flow turbulence of cooling air.

Any combination of the components or mutual replacement of the components or expressions of the present invention between methods, devices, systems, and the like are also effective as aspects of the present invention.

Hereinafter, the present invention will be described with reference to the drawings based on exemplary embodiments. The embodiments are not intended to limit the invention and are illustrative, and all features and combinations of the features described in the embodiments are not necessarily essential to the invention. The same or equivalent components, members, and processes shown in each drawing are denoted by the same reference signs, and duplicate descriptions will be omitted as appropriate.

One Embodiment

Figure 1:
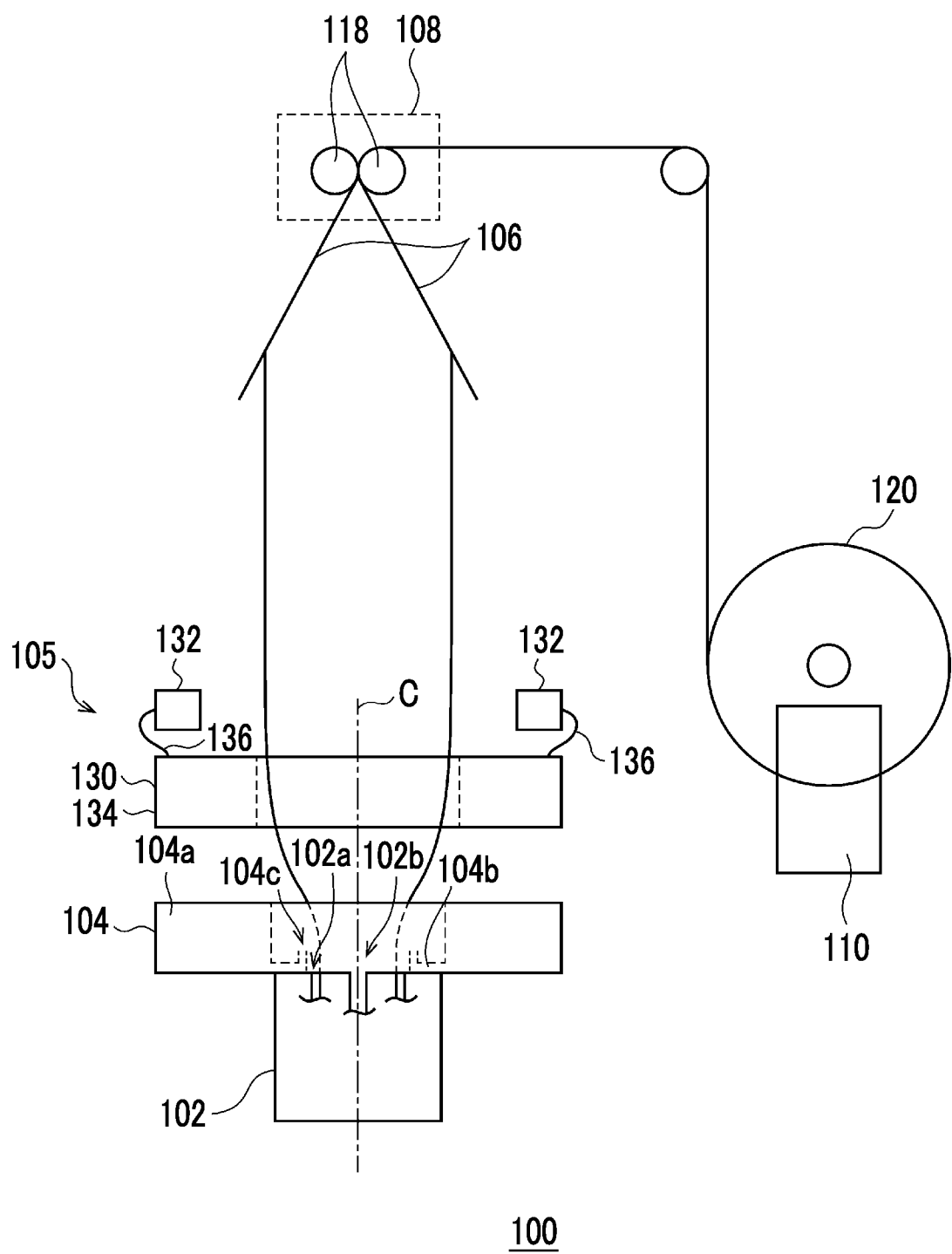
FIG. 1 is a view showing a schematic configuration of a film molding device according to one embodiment.

FIG. 1 is a view showing a schematic configuration of a film molding device 100 according to one embodiment. The film molding device 100 includes a mold 102, a cooling unit 104, a rectifying unit 105, a pair of guide units 106, a take-out machine 108, and a winding machine 110.

Hereinafter, an arbitrary direction on a plane perpendicular to a center axis C and passing through the center axis C will be described as a radial direction, a side closer to the center axis C in the radial direction and a side farther from the center axis C will be described as an inner peripheral side and an outer peripheral side, respectively, and a direction along a circumference of a circle having the center axis C as the center on a plane perpendicular to the center axis C will be described as a circumferential direction.

A molten molding material is discharged in a cylindrical shape from a discharge port 102a having a ring shape and formed in the mold 102. Air is ejected to the inside of the discharged cylindrical molding material from an air ejection port 102b formed at a central portion of the mold 102, at an appropriate timing, and a thin film inflated in a cylindrical shape (hereinafter, referred to as a "bubble") is molded.

The cooling unit 104 is disposed above the mold 102. The cooling unit 104 is a casing having a hollow ring shape and annularly surrounding the center axis C. The cooling unit 104 includes a cooling unit main body 104a having a ring shape; a supply flow path 104b extending inward in the radial direction from a lower end on the inner peripheral side of the cooling unit main body 104a; and a blow-out portion 104c that is continuous with a radially inner side of the supply flow path 104b and that is open upward. Cooling air is sent from a blower (not shown) to the cooling unit main body 104a. The cooling air sent to the cooling unit main body 104a is blown out from the blow-out portion 104c through the supply flow path 104b, and is blown into the bubble. Accordingly, the bubble is cooled. Particularly, the blow-out portion 104c is formed to be concentric with the discharge port 102a having a ring shape and having the center axis C as the center. Accordingly, heights at which the cooling air hits the bubble and air amounts become uniform in the circumferential direction.

The rectifying unit 105 includes a suction ring 130 forming a suction portion, and at least one (in this example, a plurality of) suction pump 132. The suction ring 130 is disposed above the cooling unit 104. For example, the suction ring 130 and the suction pump 132 may be hung from the guide units 106, may be supported by legs extending from the cooling unit 104, or may be fixed to a frame (not shown). The rectifying unit 105 rectifies the cooling air blown out from the cooling unit 104, and reduces the flow turbulence of the cooling air.

The pair of guide units 106 are disposed above the rectifying unit 105, and guide the bubble to the take-out machine 108. The take-out machine 108 is disposed above the guide units 106. The take-out machine 108 includes a pair of pinch rolls 118. The pair of pinch rolls 118 are rotationally driven by a motor (not shown) to fold the guided bubble into a flat shape while pulling up the guided bubble. The winding machine 110 winds the folded film to form a film roll body 120.

Figure 2:
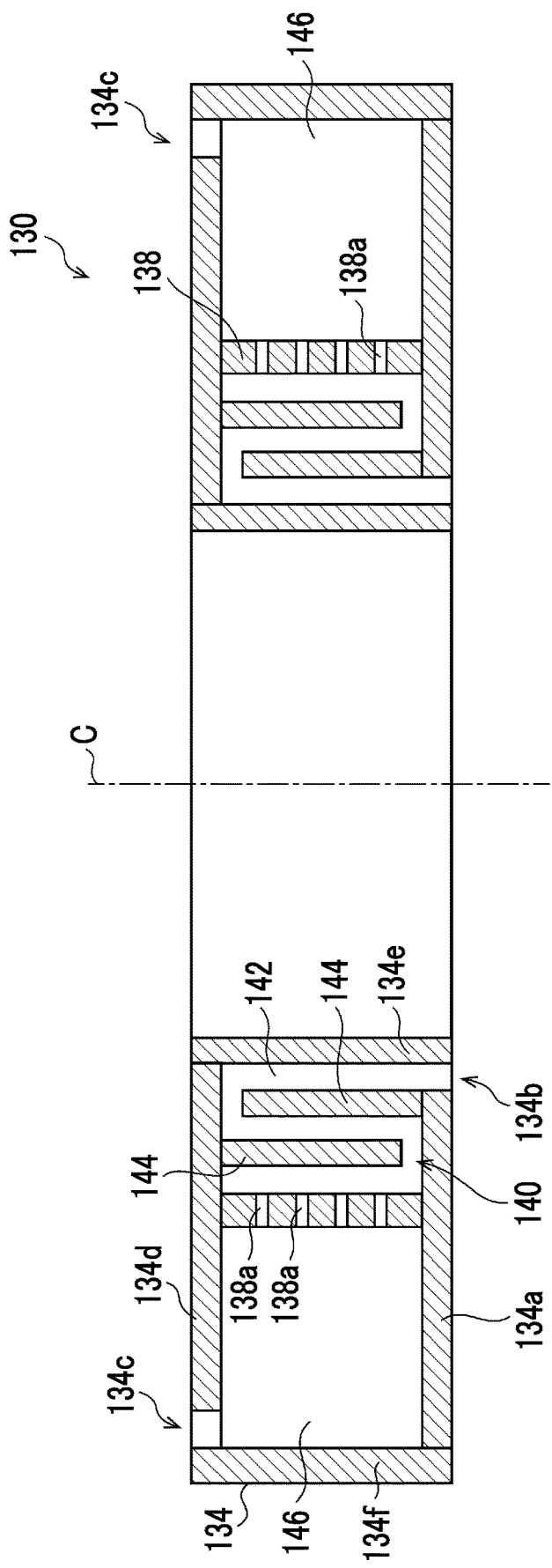
FIG. 2 is a cross-sectional view of a suction ring of FIG. 1 cut along a plane including a center axis C.
Figure 3:
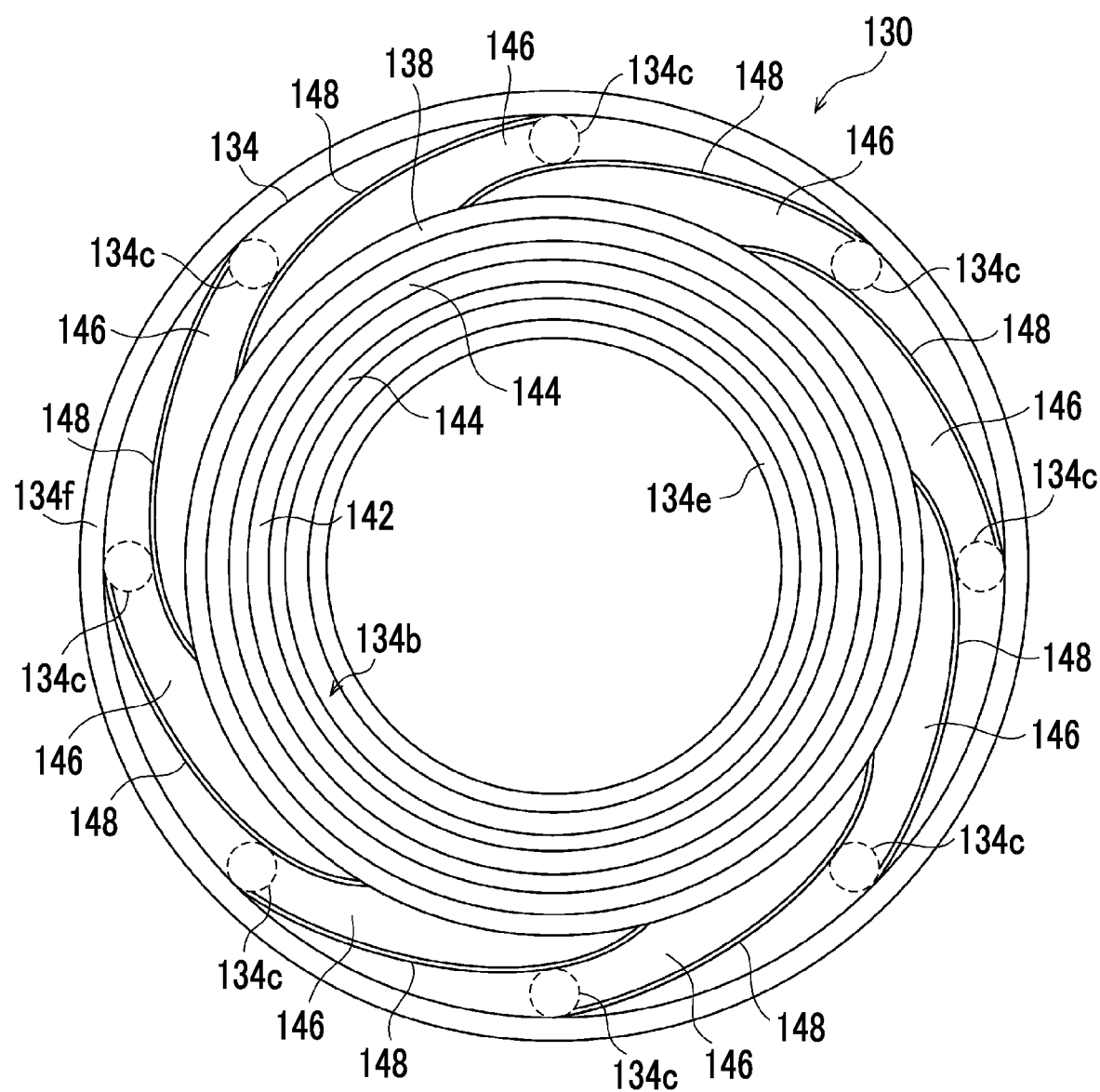
FIG. 3 is a cross-sectional view taken along line A-A of FIG. 2.

FIG. 2 is a cross-sectional view of the suction ring 130 cut along a plane including the center axis C. FIG. 3 is a top view of FIG. 2. FIG. 3 shows a state where an upper wall 134d is removed from a casing 134 of the suction ring 130. A reference will be made to FIGS. 1 to 3.

The suction ring 130 includes the casing 134 having a hollow ring shape. The casing 134 includes the upper wall 134d, a lower wall 134a, an inner wall 134e, and an outer wall 134f. A suction port 134b having a ring shape and annularly surrounding the center axis C is formed on the inner peripheral side of the lower wall 134a of the casing 134. The suction port 134b is open downward. A plurality of hose ports 134c are formed on the outer peripheral side of the casing 134. The plurality of hose ports 134c are not particularly limited, but are preferably formed at equal intervals in the circumferential direction as shown. The plurality of hose ports 134c are formed in the upper wall 134d in the shown example, but may be formed in the lower wall 134a.

The plurality of hose ports 134c and at least one suction pump 132 are connected by hoses 136. When the suction pump 132 is operated and the air inside the casing 134 is suctioned via the hoses 136, the cooling air blown out from the cooling unit 104 and rising along the bubble is suctioned from the suction port 134b into the casing 134. The flow turbulence of the cooling air is reduced by suctioning the cooling air, which is blown out from the cooling unit 104, on a downstream side. A height position where the suction ring 130 is provided may be determined based on experiment, simulation, or knowledge.

A baffle plate 138 having a cylindrical shape is provided inside the casing 134. The baffle plate 138 partitions a space inside the casing 134 into a suction port 134b side and a hose port 134c side. The baffle plate 138 is provided with a large number of through-holes 138a that communicate between the suction port 134b side and the hose port 134c side. In this example, the large number of through-holes 138a extend in the radial direction. The cooling air suctioned from the suction port 134b into the casing 134 flows to the hose port 134c side through the through-holes 138a.

Here, it is considered a case where the baffle plate 138 is not provided. Since the hose ports 134c are discontinuously formed in the circumferential direction, a suction force of a portion of the suction port 134b close to the hose ports 134c, namely, a portion of the suction port 134b located inside the hose ports 134c in the radial direction becomes strong, and a suction force of a portion of the suction port 134b far from the hose ports 134c, namely, a portion of the suction port 134b not located inside the hose ports 134c in the radial direction becomes weak. Namely, the suction force at the suction port 134b becomes non-uniform in the circumferential direction. On the other hand, by providing the baffle plate 138 between the hose ports 134c and the suction port 134b, the air flow on an upstream side (namely, the inner peripheral side) of the baffle plate 138 becomes uniform, and the suction force from the suction port 134b becomes relatively uniform in the circumferential direction. By suctioning the cooling air with a suction force that is more uniform in the circumferential direction, the flow of the cooling air rising along the bubble also becomes more uniform in the circumferential direction.

A labyrinth portion 140 is provided on the inner peripheral side of the baffle plate 138. The labyrinth portion 140 is a portion including a flow path that is complicatedly curved. In the present embodiment, the labyrinth portion 140 includes a flow path 142 with a bellows-shaped cross section. In the present embodiment, the flow path 142 is formed by alternately disposing a plate 144 having a cylindrical shape and fixed to form a gap between the plate 144 and the upper wall 134d, and a plate 144 having a cylindrical shape and fixed to form a gap between the plate 144 and the lower wall 134a, in the radial direction. By providing the labyrinth portion 140, a flow path from the suction port 134b to the baffle plate 138 becomes long, and the air flow in the flow path becomes more uniform in the circumferential direction, and as a result, the suction force from the suction port 134b becomes more uniform.

Smoothing flow paths 146 are provided on the outer peripheral side of the baffle plate 138. The smoothing flow paths 146 are flow paths that are partitioned off by a plurality of partition walls 148 curved in the circumferential direction, and that extend toward the plurality of respective hose ports 134c in the circumferential direction. By providing the smoothing flow paths 146 extending in the circumferential direction, the distance until the air passing through the baffle plate 138 travels until reaching the hose ports 134c becomes relatively long.

According to the present embodiment described above, the cooling air blown out from the cooling unit 104 and rising along the bubble is suctioned by the rectifying unit 105. Accordingly, the flow turbulence of the cooling air rising along the bubble is reduced.

In addition, according to the present embodiment, the baffle plate 138, the labyrinth portion 140, and the smoothing flow paths 146 are provided inside the suction ring 130. Accordingly, the suction force from the suction port 134b becomes more uniform in the circumferential direction, and the flow of the cooling air can be made more uniform in the circumferential direction.

Subsequently, a modification example related to the one embodiment will be described.

Figure 4:
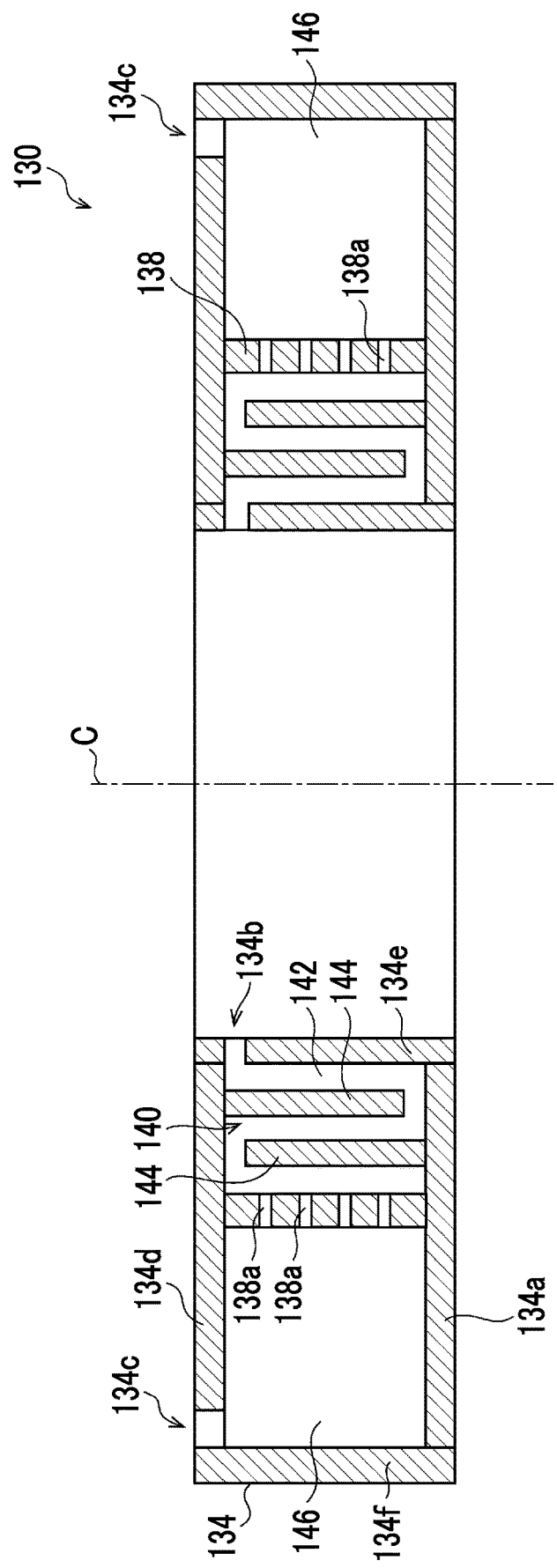
FIG. 4 is a cross-sectional view of a suction ring according to a modification example of the one embodiment.

FIG. 4 is a cross-sectional view of the suction ring 130 according to the modification example of the one embodiment. FIG. 3 corresponds to FIG. 2. In the suction ring 130 according to the modification example, the suction port 134b having a ring shape in the suction ring 130 is formed in the inner wall 134e of the casing 134. Therefore, the suction port 134b is open to the inner peripheral side. In the shown example, the suction port 134b is provided on an upper side of the inner wall 134e, but may be provided on a lower side or at a center in an up-down direction. According to the present modification example, the same effects as those of the one embodiment can be obtained.

Another Embodiment

In another embodiment, a case will be described in which the film molding device includes rectifying plates for rectifying cooling air from the cooling unit. In the other embodiment, the cooling air from the cooling unit is suctioned into spaces divided by the rectifying plates. Hereinafter, the differences from the one embodiment will be mainly described.

Figure 5:
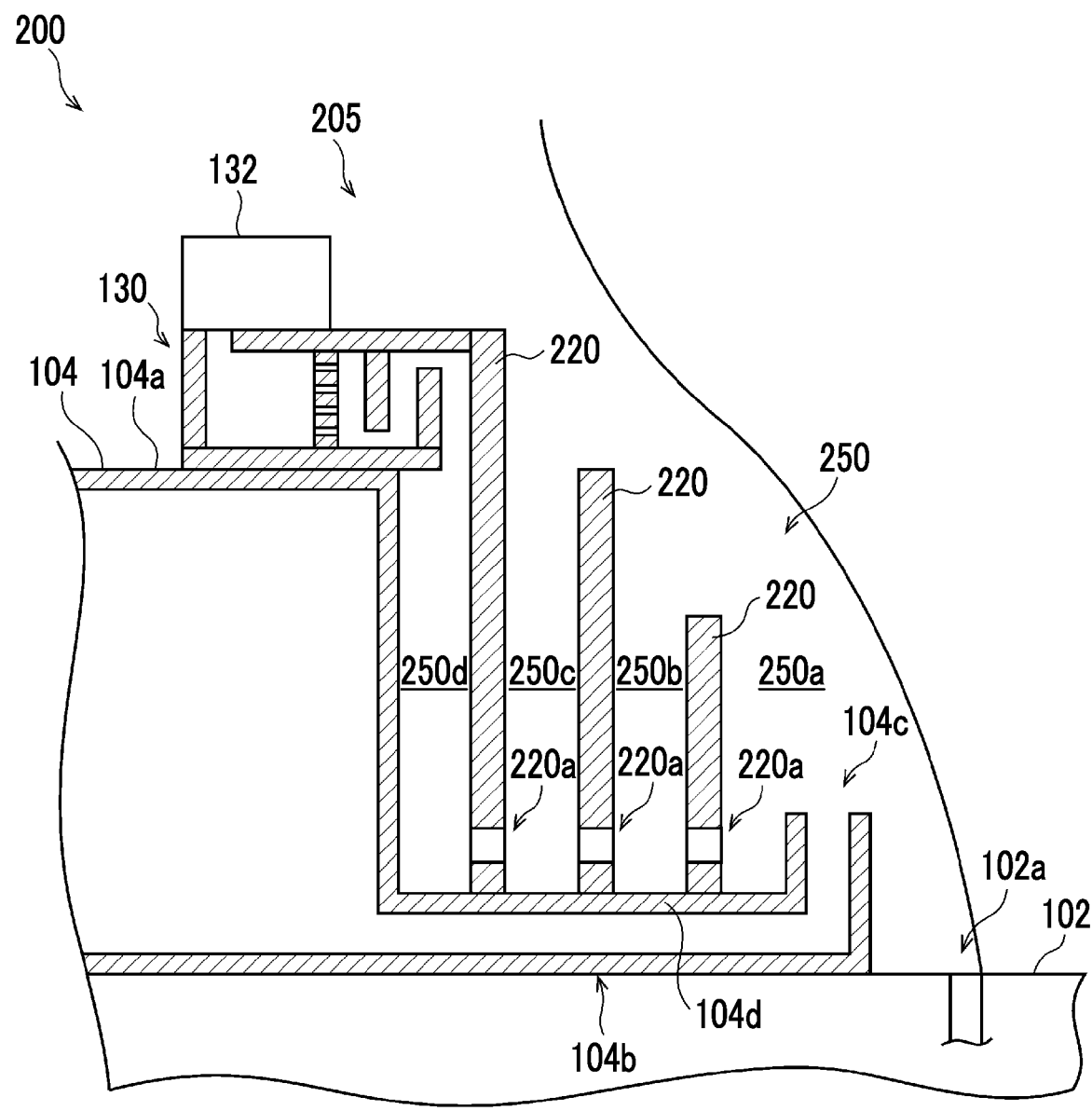
FIG. 5 is an enlarged cross-sectional view showing a rectifying unit of a film molding device and a periphery of the rectifying unit according to another embodiment.

FIG. 5 is an enlarged cross-sectional view showing a rectifying unit 205 of a film molding device 200 and a periphery of the rectifying unit 205 according to the other embodiment.

The film molding device 200 includes the mold 102, the cooling unit 104, the rectifying unit 205, the pair of guide units 106, the take-out machine 108, and the winding machine 110. The display of the pair of guide units 106, the take-out machine 108, and the winding machine 110 are omitted.

The rectifying unit 205 includes at least one (in this example, a plurality of) rectifying plate 220 for rectifying the cooling air, the suction ring 130 forming a suction portion, and the suction pump 132. Since the shape and configuration of the suction ring 130 are the same as those of the one embodiment, the description thereof will be omitted. The plurality of rectifying plates 220 are cylindrical plates with different diameters from each other. The plurality of rectifying plates 220 are concentrically disposed around the center axis C (not shown in FIG. 5). The plurality of rectifying plates 220 are not particularly limited, but in this example, are placed on and fixed to an upper wall 104d of the supply flow path 104b. The height positions of upper ends of the plurality of rectifying plates 220 become higher as the rectifying plates 220 are located further outside in the radial direction.

A space 250 between the bubble and the cooling unit 104 is divided into a plurality of spaces 250a to 250d by the rectifying plates 220. Communication holes 220a that communicate between the plurality of spaces 250a to 250d are formed in the rectifying plates 220.

The suction ring 130 is installed to block the space 250d between the rectifying plate 220 located on the outermost side in the radial direction and the cooling unit main body 104a. In the present embodiment, the suction ring 130 is installed to block an upper end of the space 250d between the rectifying plate 220 located on the outermost side in the radial direction and the cooling unit main body 104a. When the suction pump 132 is operated, the air in the plurality of spaces 250a to 250d is suctioned by the suction ring 130, and as a result, the cooling air blown out from the cooling unit 104 is suctioned into the plurality of spaces 250a to 250d.

The pressure in the spaces 250b to 250d may decrease due to the suctioning of the air to the suction ring 130, and the bubble may be attracted to the spaces 250b to 250d. When the attracted bubble comes into contact with the rectifying plates 220, the bubble is damaged. On the other hand, since the communication hole 220a is also formed in the rectifying plate 220 located on the innermost side, when the bubble is about to come into contact with the rectifying plates 220, outside air flows in from the communication hole 220a of the rectifying plate 220 located on the innermost side, and the pressure in the spaces 250b to 250d increases, thereby preventing the bubble from coming into contact with the rectifying plates 220.

According to the present embodiment described above, the cooling air blown out from the cooling unit 104 and rising along the bubble is suctioned by the rectifying unit 205. By providing the rectifying plates 220, the flow of the cooling air is rectified to some extent, namely, the flow turbulence of the cooling air is reduced; however, the flow turbulence of the cooling air is further reduced by suctioning the cooling air on a downstream side of the rectifying plates 220.

Subsequently, a modification example related to the other embodiment will be described.

Figure 6:
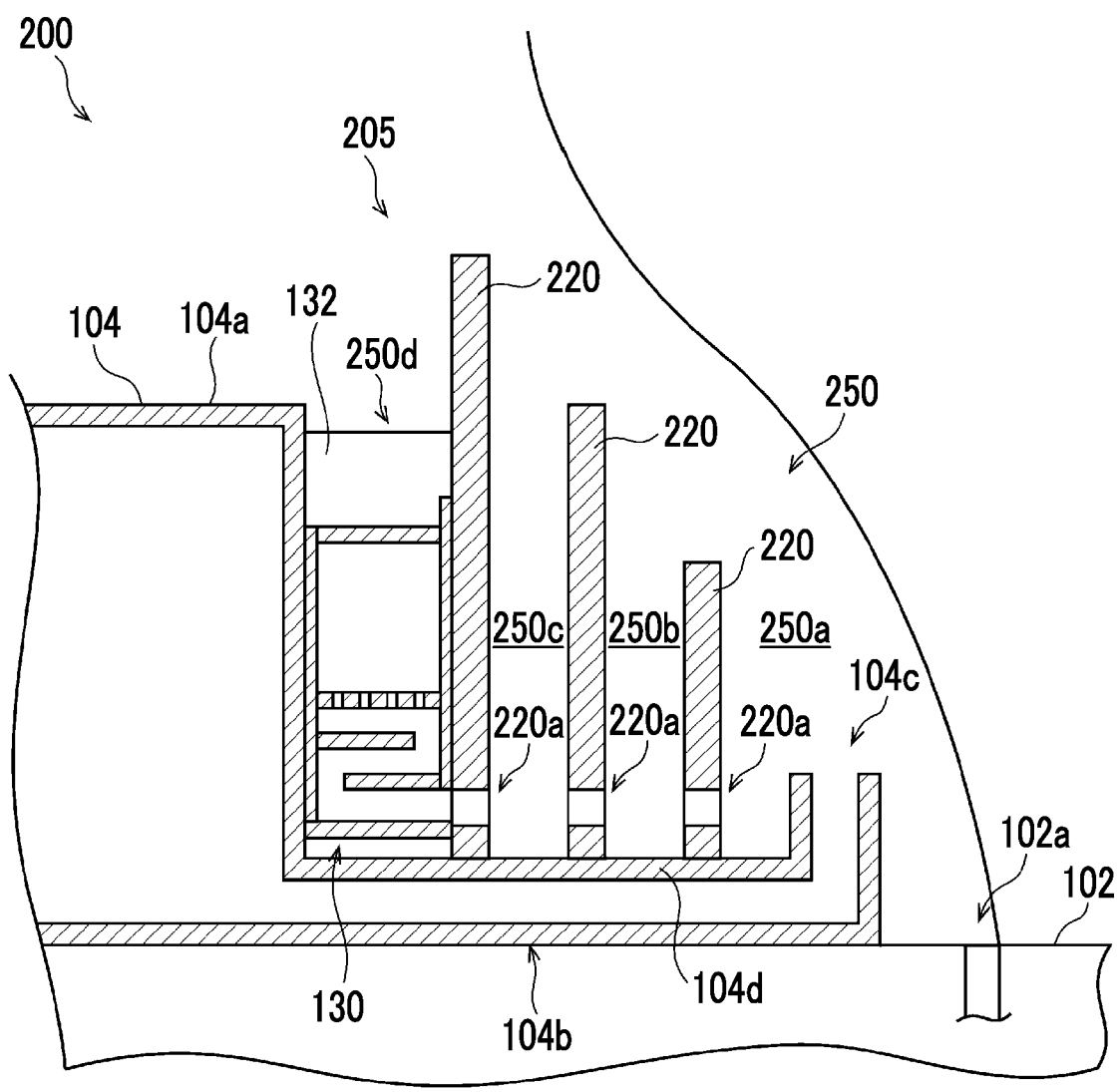
FIG. 6 is an enlarged cross-sectional view showing a rectifying unit of a film molding device and a periphery of the rectifying unit according to a modification example of the other embodiment.

FIG. 6 is an enlarged cross-sectional view showing the rectifying unit 205 of the film molding device 200 and a periphery of the rectifying unit 205 according to the modification example of the other embodiment. FIG. 6 corresponds to FIG. 5. In the present modification example, the suction ring 130 is disposed in the space 250d between the rectifying plate located on the outermost side in the radial direction and the cooling unit main body 104a. The suction ring 130 of the present modification example is configured such that the labyrinth portion 140, the baffle plate 138, and the smoothing flow paths 146 are arranged in order inside the casing 134. The suction port 134b having a ring shape is formed in the inner wall 134e of the casing 134, and is directly connected to the communication hole 220a formed in the rectifying plate 220 located on the outermost side in the radial direction. According to the present modification example, the same effects as those of the other embodiment can be obtained.

Still Another Embodiment

In still another embodiment, similarly to the other embodiment, a case will be described in which the film molding device includes the rectifying plates. Hereinafter, the differences from the other embodiment will be mainly described.

Figure 7:
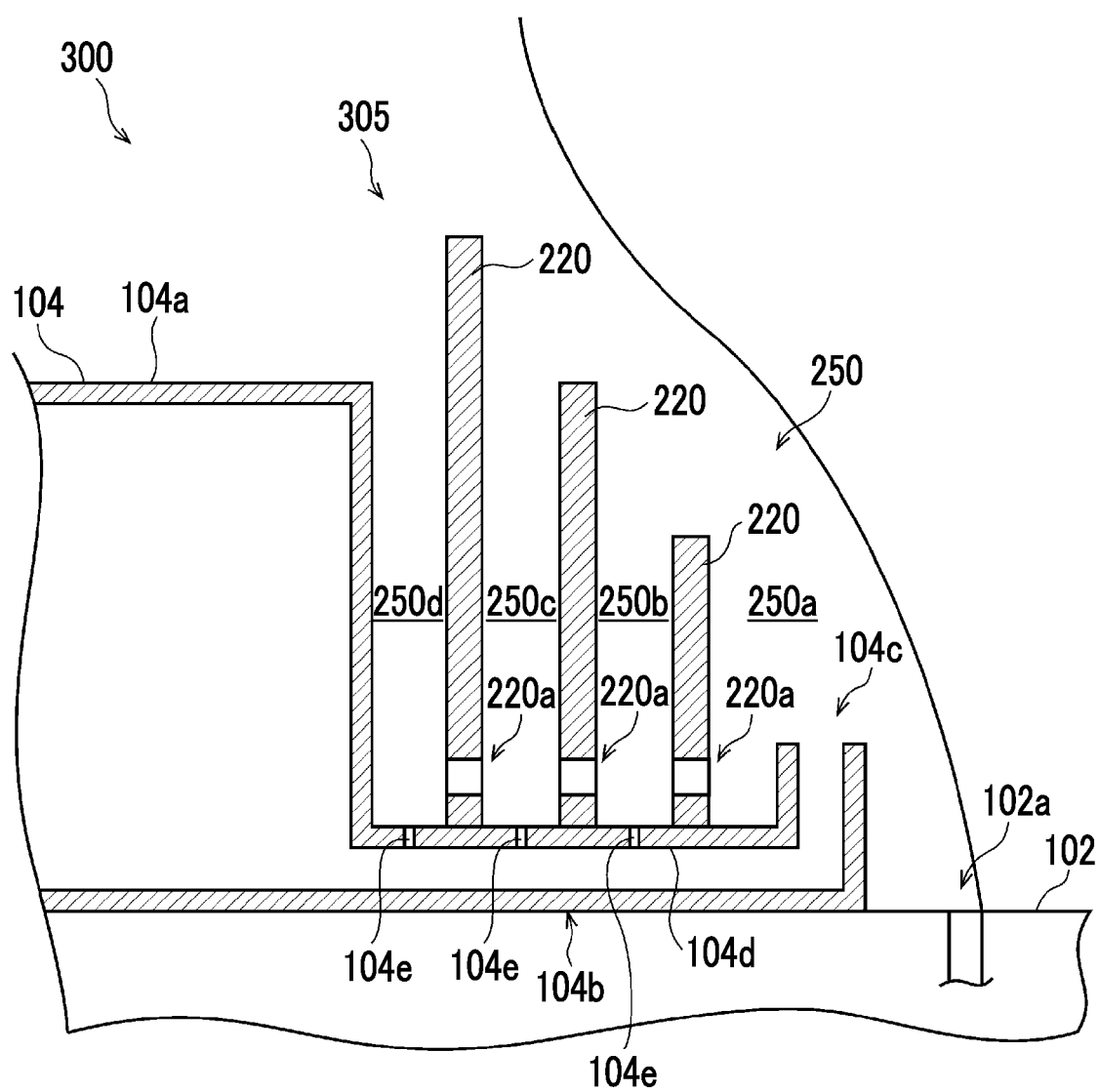
FIG. 7 is an enlarged cross-sectional view showing a rectifying unit of a film molding device and a periphery of the rectifying unit according to still another embodiment.

FIG. 7 is an enlarged cross-sectional view showing a rectifying unit 305 of a film molding device 300 and a periphery of the rectifying unit 305 according to still the other embodiment. Hereinafter, the differences from the film molding device 200 according to the other embodiment will be mainly described.

The film molding device 300 includes the mold 102, the cooling unit 104, the rectifying unit 305, the pair of guide units 106, the take-out machine 108, and the winding machine 110. The display of the pair of guide units 106, the take-out machine 108, and the winding machine 110 are omitted.

The rectifying unit 305 includes at least one (in this example, a plurality of) rectifying plate 220 and at least one (in this example, a plurality of) communication path 104e forming a suction portion. The plurality of communication paths 104e penetrate through the upper wall 104d of the supply flow path 104b in the up-down direction, and communicate between a plurality of the respective spaces 250b to 250d divided by the rectifying plates 220 and the supply flow path 104b of the cooling unit 104. In this example, the plurality of communication paths 104e extend linearly in a vertical direction. In other words, the plurality of communication paths 104e extend linearly, and an extending direction of the communication paths 104e and an extending direction of the supply flow path 104b are perpendicular to each other.

Figure 8B:
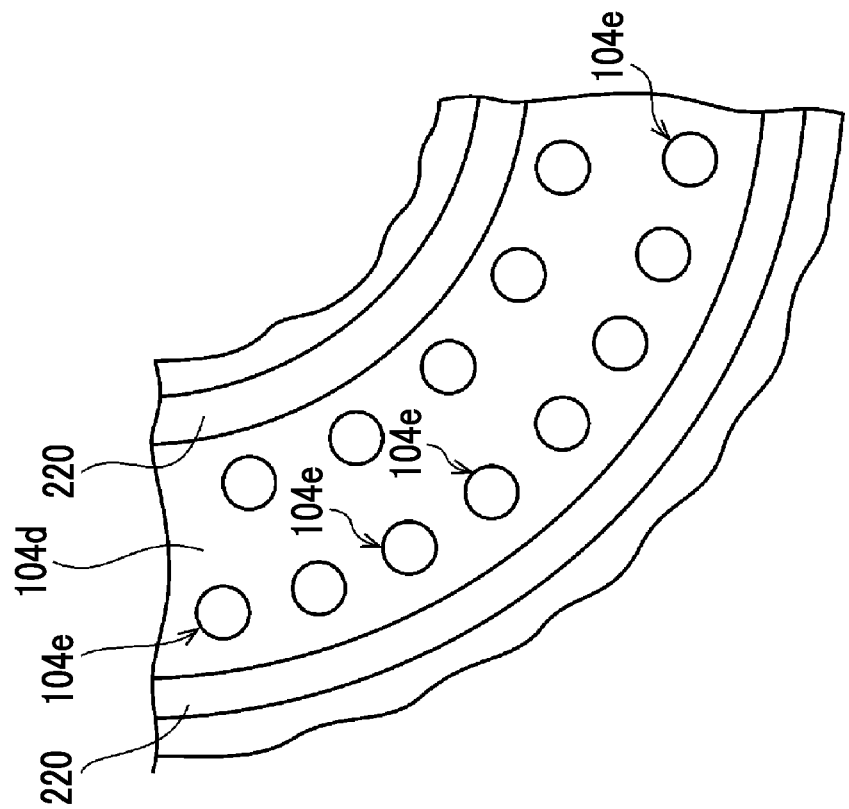
FIGS. 8A and 8B are top views showing examples of a communication path.
Figure 8A:
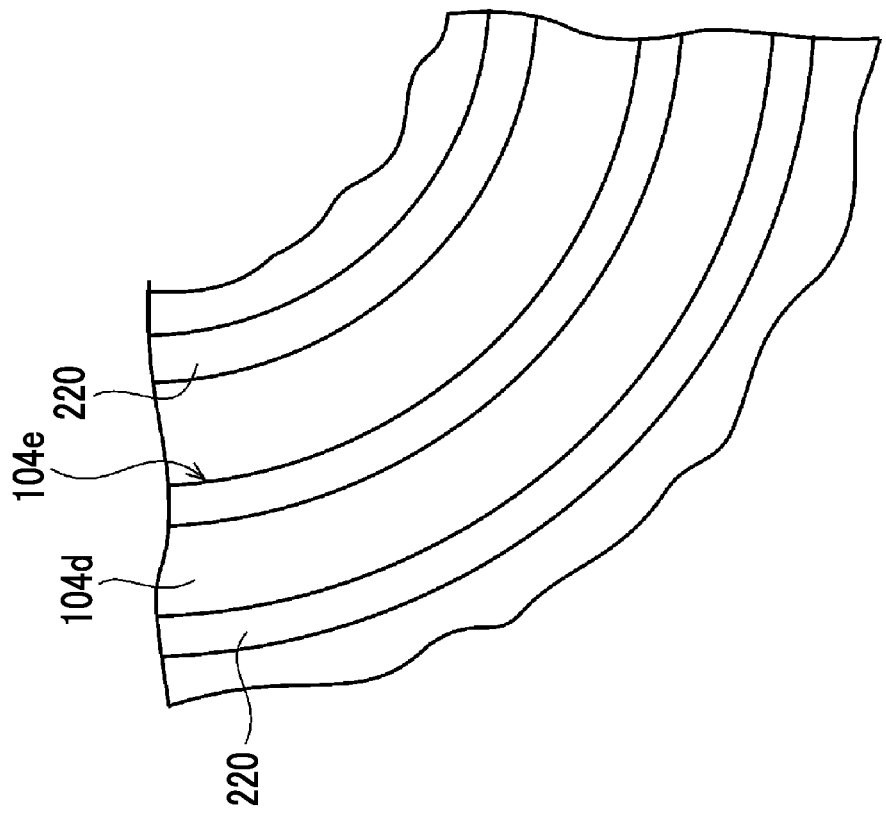

FIGS. 8A and 8B are top views showing examples of the communication path 104e. In the example of FIG. 8A, the communication paths 104e are formed in a groove shape extending in the circumferential direction in a plan view. In the example of FIG. 8B, the communication paths 104e are circular holes in a plan view.

The plurality of spaces 250b to 250d may communicate with each other through one communication path 104e as shown in FIG. 8A, or may communicate with each other through the plurality of communication paths 104e as shown in FIG. 8B.

When the flow speed of the cooling air flowing through the supply flow path 104b increases, the pressure in the supply flow path 104b decreases, and a differential pressure is generated between the supply flow path 104b on one end side of the communication paths 104e and the spaces 250b to 250d on the other end side. Accordingly, the air in the plurality of spaces 250b to 250d is suctioned to a supply flow path 104b side via the communication paths 104e, the plurality of spaces 250b to 250d become negative pressure, and the cooling air blown out from the cooling unit 104 is suctioned into the plurality of spaces 250b to 250d.

When the diameter of the communication paths 104e is too large, the cooling air flows from the supply flow path 104b into the cooling unit 104. Therefore, the communication paths 104e may be formed to a size that prevents the cooling air from flowing from the supply flow path 104b into the communication paths 104e, based on experiment, simulation, or the like.

In addition, when the flow speed of the cooling air in the supply flow path 104b is high, it is considered that the cooling air is less likely to flow from the supply flow path 104b into the communication paths 104e. In addition, in order to obtain a desired differential pressure, the flow speed of the cooling air flowing through the supply flow path 104b needs to be a certain level or higher. Therefore, the supply flow path 104b may be formed with a flow path area (namely, height) that can realize the desired flow speed.

According to the present embodiment described above, the same effects as those of the other embodiment can be obtained.

Subsequently, a modification example related to still the other embodiment will be described.

Figure 9:
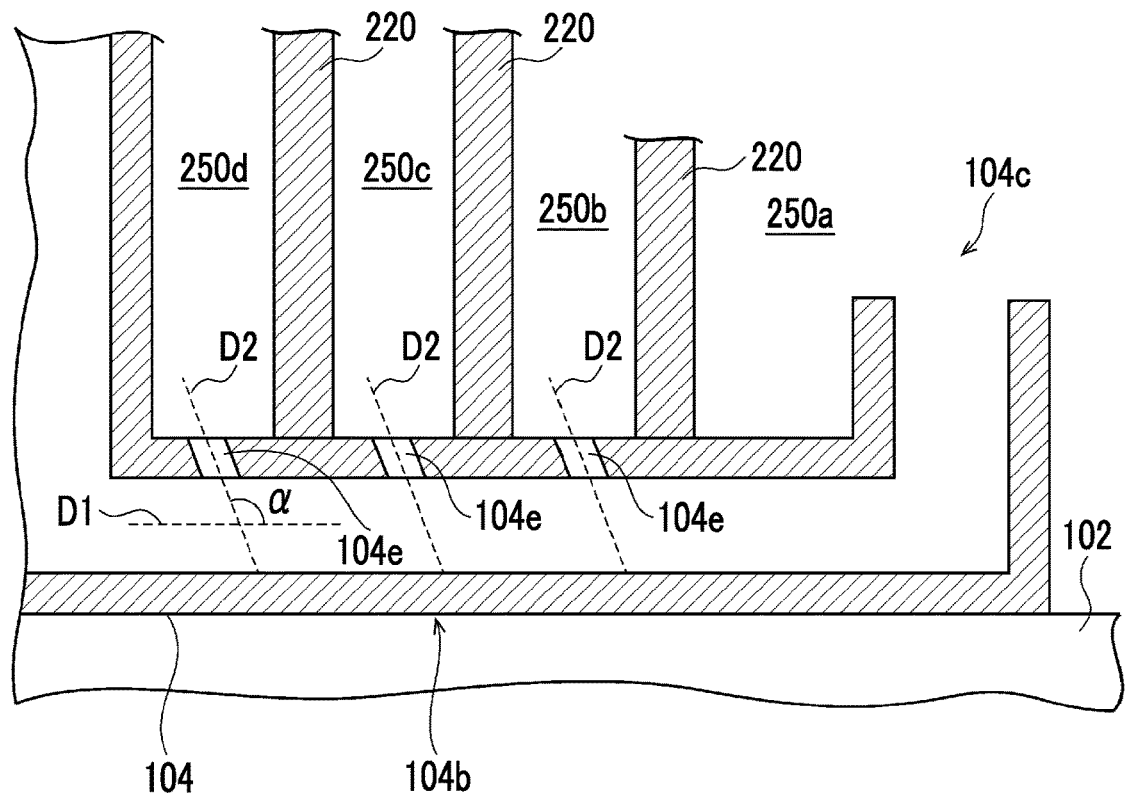
FIG. 9 is a view showing a periphery of a discharge port of a mold of a film molding device according to a modification example of still the other embodiment.

FIG. 9 is an enlarged cross-sectional view showing the rectifying unit 305 of the film molding device 300 and a periphery of the rectifying unit 305 according to the modification example of still the other embodiment. FIG. 9 corresponds to FIG. 7. In the present modification example, the plurality of communication paths 104e extend linearly, and an angle α formed by an extending direction D1 of the supply flow path 104b and an extending direction D2 of the communication paths 104e is larger than 90°. According to the present modification example, the flow of the cooling air into the communication paths 104e can be suppressed, the cooling air flowing inward in the radial direction through the supply flow path 104b toward the blow-out portion 104c.

Figure 10:
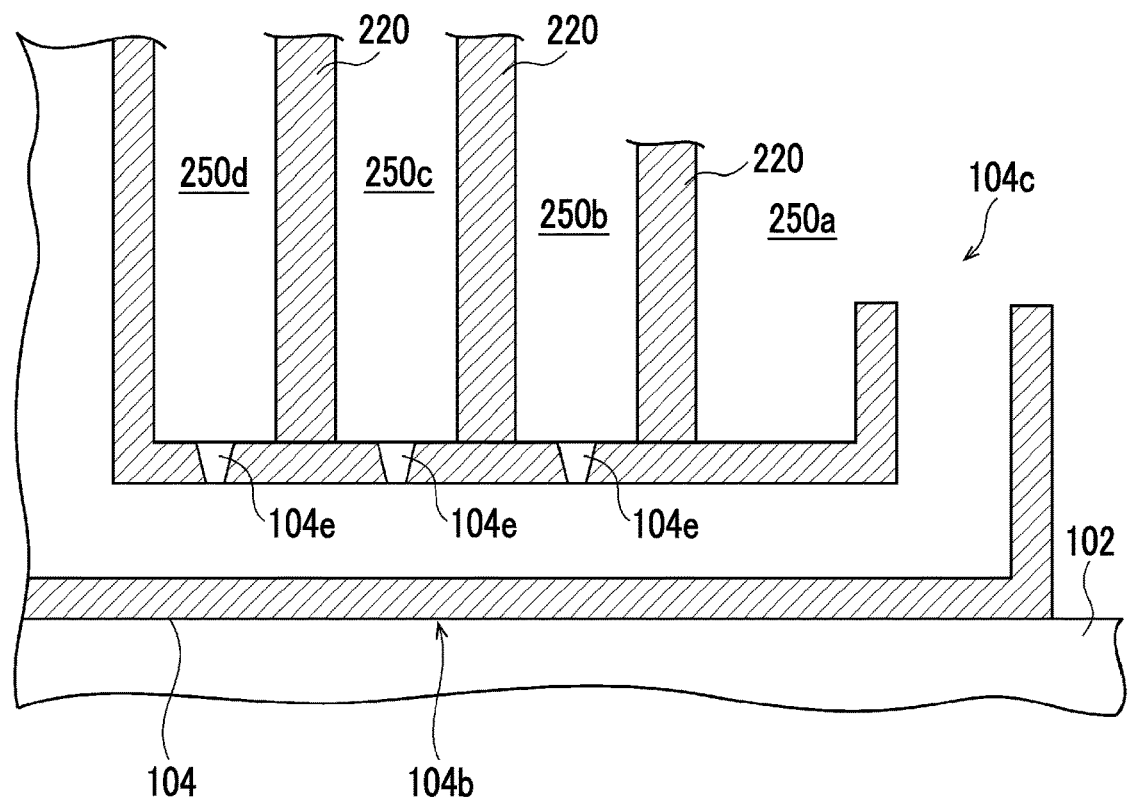
FIG. 10 is a view showing a periphery of a discharge port of a mold of a film molding device according to another modification example of still the other embodiment.

FIG. 10 is a view showing a periphery of the discharge port 102a of the mold 102 of the film molding device 300 according to another modification example of still the other embodiment. FIG. 10 corresponds to FIG. 7. In the present modification example, the plurality of communication paths 104e are formed such that the communication paths 104e are linear in the vertical direction and widen toward an upper side. According to the present modification example, the cooling air is less likely to flow from the supply flow path 104b into the communication paths 104e, and is more likely to flow from the spaces 250b to 250d into the communication paths 104e.

In addition, the modification example of FIG. 9 and the modification example of FIG. 10 may be combined. Namely, the communication paths 104e may be formed such that the communication paths 104e widen toward the upper side and the angle α formed by the extending direction of the communication paths 104e and the extending direction of the supply flow path 104b is larger than 90°.

Subsequently, a modification example common to the one to still the other embodiments will be described.

In the embodiments, a case has been described in which the mold 102 is a so-called round mold in which the discharge port 102a has an annular shape; however, the present invention is not limited thereto. At least a part of the technical concept of the embodiments can be applied to a so-called T-mold in which the discharge port has a linear shape.

The present invention has been described using specific terms and phrases based on the embodiments; however, the embodiments merely illustrate one aspect of the principles and applications of the present invention, and various modification examples or changes in disposition can be recognized in the embodiments without departing from the concept of the present invention defined in the appended claims.

The present invention relates to a film molding device.

It should be understood that the invention is not limited to the above-described embodiment, but may be modified into various forms on the basis of the spirit of the invention. Additionally, the modifications are included in the scope of the invention.

What is claimed is:

1. A film molding device comprising:
a cooling unit that cools a molding material discharged from a mold; and
a rectifying unit that rectifies cooling air blown out from the cooling unit,
wherein the rectifying unit includes a suction portion that suctions the cooling air,
the cooling unit cools the molding material discharged in a substantially cylindrical shape from the mold,
the rectifying unit includes a plurality of rectifying plates disposed outside the molding material in a radial direction along the molding material, and
the suction portion suctions the cooling air into a space divided by the plurality of rectifying plates along the rectifying plates.

2. The film molding device according to claim 1, wherein the suction portion suctions the cooling air rising along the molding material.

3. The film molding device according to claim 1, wherein the plurality of rectifying plates are concentrically disposed, and
the spaces divided by the plurality of rectifying plates communicate with each other.

4. The film molding device according to claim 1, wherein the cooling unit includes a blow-out portion that blows out the cooling air toward the molding material, and a supply flow path that supplies the cooling air to the blow-out portion, and
the suction portion includes a communication path that communicates between the space divided by the rectifying plate and the supply flow path.

5. The film molding device according to claim 3, wherein the communication path is configured such that the cooling air in the space divided by the rectifying plate flows into the communication path.

* * * * *